US008532955B2

(12) United States Patent
Tang et al.

(10) Patent No.: US 8,532,955 B2
(45) Date of Patent: Sep. 10, 2013

(54) MINIMIZATION OF FALSE TRIGGER IN A MOBILE ELECTRONIC SYSTEM

(75) Inventors: Cheng Ping Tang, Fremont, CA (US); Jiun-Tao Chen, Saratoga, CA (US); James Tao, Redwood City, CA (US); David John Yeh, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 632 days.

(21) Appl. No.: 12/394,030

(22) Filed: Feb. 26, 2009

(65) Prior Publication Data

US 2010/0217558 A1   Aug. 26, 2010

(51) Int. Cl.
*G01P 15/00* (2006.01)
*G11B 21/02* (2006.01)

(52) U.S. Cl.
USPC ............................................. 702/141; 360/75

(58) Field of Classification Search
USPC ............. 702/141, 33, 41, 56, 79, 81, 84, 127, 702/150–154, 176, 182–185, 187–189; 360/69, 360/73.03, 75–77.17; 73/1.37, 1.75, 1.79, 73/1.82, 488–495, 510–511, 514.01–514.02, 73/514.15, 570, 577–578; 700/302
See application file for complete search history.

(56) References Cited

U.S. PATENT DOCUMENTS

| 6,226,140 | B1 * | 5/2001 | Serrano et al. | 360/60 |
| 6,520,013 | B1 | 2/2003 | Wehrenberg | |
| 7,369,345 | B1 * | 5/2008 | Li et al. | 360/75 |
| 7,595,958 | B2 * | 9/2009 | Partee | 360/97.02 |
| 2006/0268447 | A1 * | 11/2006 | Liao et al. | 360/75 |
| 2008/0236282 | A1 * | 10/2008 | Kim et al. | 73/514.01 |
| 2009/0021858 | A1 * | 1/2009 | Fu et al. | 360/99.01 |

* cited by examiner

*Primary Examiner* — Toan Le
(74) *Attorney, Agent, or Firm* — Womble Carlyle Sandridge & Rice LLP

(57) ABSTRACT

Preventative actions normally performed in response to detecting a trigger event triggered by an accelerometer attached to a portable device may be bypassed during a quiet period. The quiet period may be initiated in response to detecting at least one repeated trigger event within a time window encompassing the first trigger event, and may be terminated based on an expiration criterion.

16 Claims, 7 Drawing Sheets

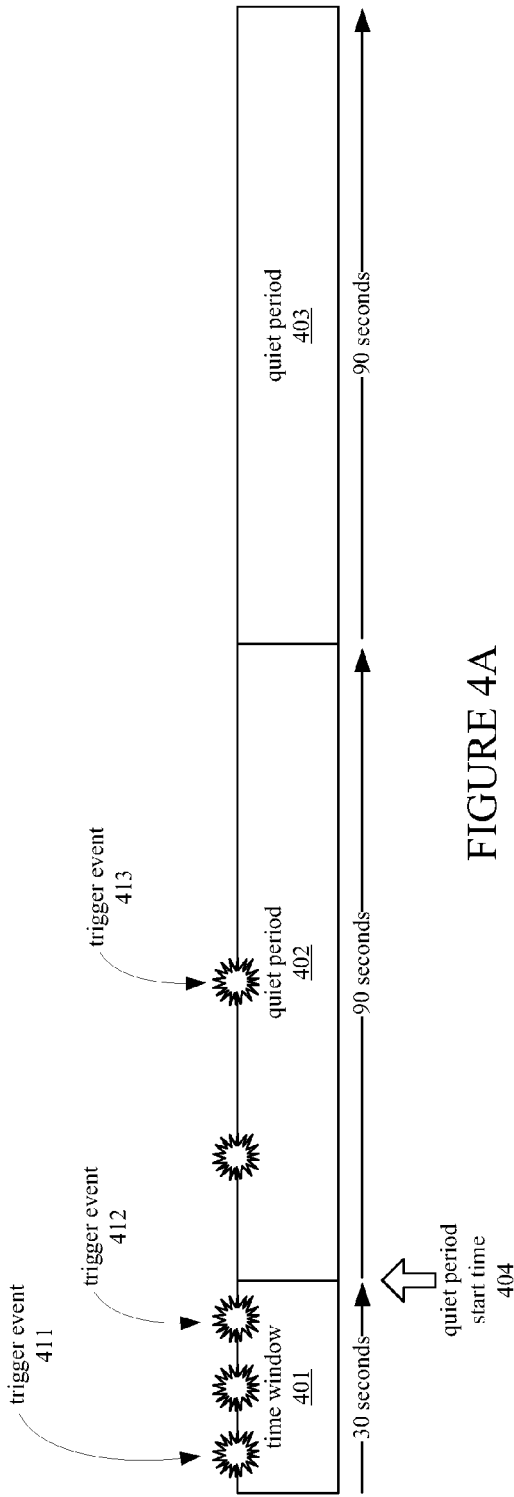
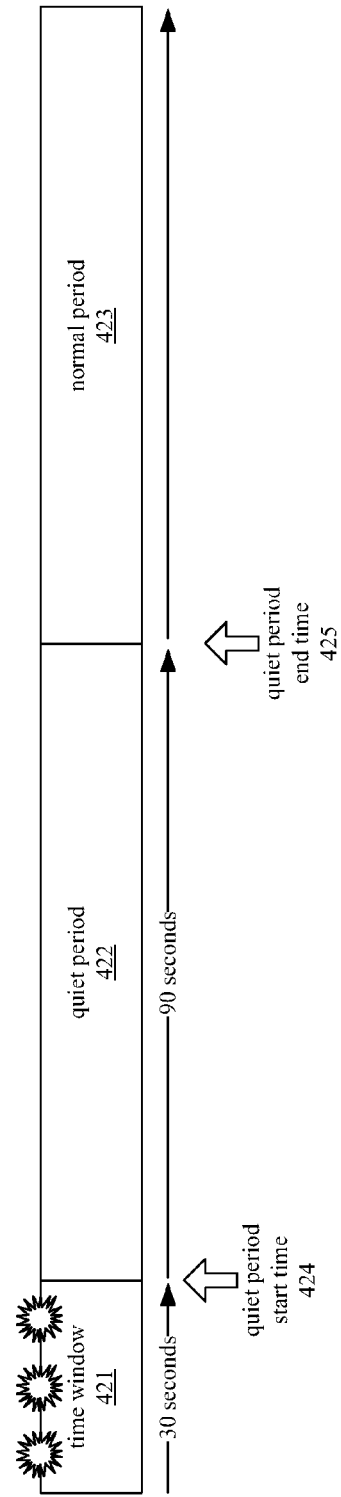
FIGURE 4A
FIGURE 4B

MINIMIZATION OF FALSE TRIGGER IN A MOBILE ELECTRONIC SYSTEM

FIELD OF INVENTION

The present invention relates to mobile electronic devices, and more particularly, to acceleration sensing of mobile electronic devices.

BACKGROUND

Shock and impact forces sustained by mobile electronic systems or devices during usage can be detrimental to the reliability of components within the mobile devices, such as hard disk drives. This may be especially true when mobile devices are in operation. For example, excessive shock force can cause a recording head in a disk drive to contact the spinning disk, resulting in damage to the recording head or disk surface, and leading ultimately to loss of the data stored on the disk.

Various methods are used to protect the hard disk drive from such shock and impact. For example, such methods may include mechanically tuning the HDD actuator to minimize contact force with the disk during a shock or impact event, or embedding an accelerometer in the hard disk drive to detect a free fall and park the HDD actuator prior to an anticipated impact.

However, the free fall detection scheme in particular may be prone to false triggering. User handling of the computer system may cause movement of the system that is interpreted as a freefall event, resulting in unnecessary parking of the hard drive actuator. Similarly, any repetitive motion may also cause undesired frequent triggers of the freefall sensor. Furthermore, the false trigger typically increases when the accelerometer is calibrated for greater sensitivity to detect a lower drop height.

Excessive false detection results in unnecessary parking of the hard drive actuator and has a detrimental impact on computer system I/O performance. Excessive parking of the hard drive actuator can result in the interruption of data transfer activities between the hard disk drive and the computer system, and can lead to system stability issues or software application performance issues.

BRIEF DESCRIPTION OF THE DRAWINGS

The present invention is illustrated by way of example and not limitation in the figures of the accompanying drawings, in which like references indicate similar elements and in which:

FIG. 4A is a timeline illustrating a trigger event detection process according to one embodiment;

FIG. 4B a timeline illustrating a trigger event detection process according to one embodiment;

DETAILED DESCRIPTION

Figure 1:
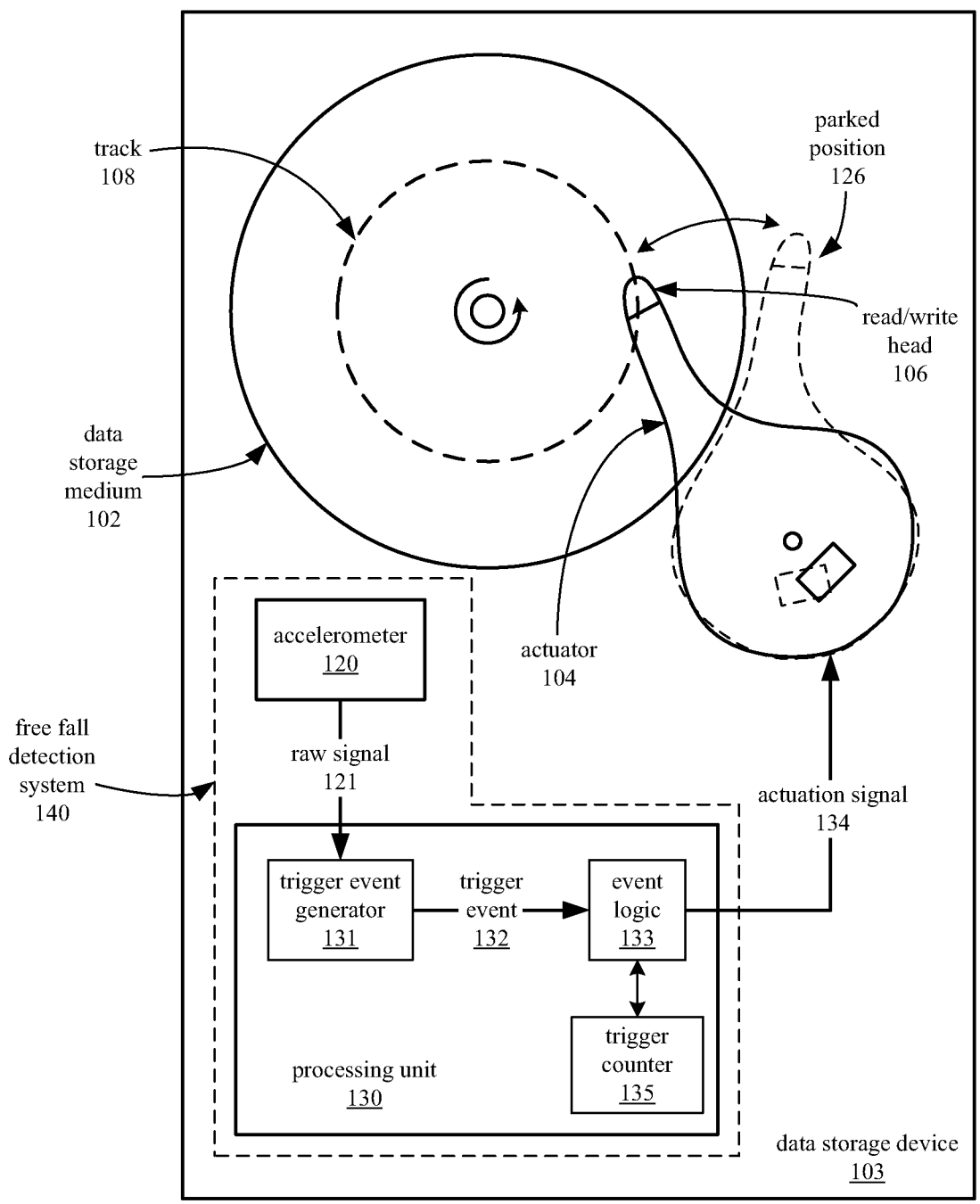
FIG. 1 illustrates one embodiment of a data storage device.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

One embodiment of a mechanism for reducing the number of false triggers detected by a free fall detection system may take advantage of the contexts in which true free fall events occur, as compared to normal user handling of the computer system.

In many cases, a true free fall or a shock event is typically not repetitive within a short duration. For example, such a free fall event may be caused by a user dropping the computer system, and the likelihood is small that the user will drop the computer system more than once or twice within a given window of time.

In contrast, dynamic motions (velocity, displacement, and acceleration) and input forces from regular usage and handling of the mobile computer system often show repetitive patterns. For example, if the mobile computer system is carried by a user who is walking or riding in a car, the computer system may experience repetitive motion that may be interpreted as repeated trigger events by a free fall detection system. However, these motions typically are not harmful to the computer system and should not result in preventative action by the computer system.

Thus, a mechanism for reducing the false trigger rate can distinguish between trigger events based on whether or not the trigger event is repetitive within a given time window. Such a mechanism may reduce the number of false triggers by adjusting the criteria for identifying a trigger event from raw sensor data, or by qualifying an identified trigger event as a false trigger based on a pattern of identified trigger events.

One embodiment of a mechanism for reducing the number of false triggers monitors for repetitive discrete trigger events reported according to a sensor processing procedure.

During a normal operation, a processing unit, such as a microprocessor or controller, receives a raw signal from an accelerometer. The processing unit applies the sensor processing procedure to the raw signal. When application of the sensor processing procedure confirms a trigger event, the processing unit sends an actuation signal to an actuator to initiate some preventative action. For example, the actuator may be a hard disk drive (HDD) actuator that is parked in anticipation of a shock or impact in response to the actuation signal.

In one embodiment, the processing unit initiates a quiet period in response to detecting a threshold number of repetitive trigger events within a predefined time window. During the quiet window, the processing unit identifies a trigger event based on the raw sensor data, but bypasses or avoids sending the actuation signal in response to the trigger event. Thus, the preventative action is avoided during the quiet period.

In one embodiment, the quiet period is terminated when the rate of trigger event detection within the quiet period is below a predefined threshold. This step indicates that a repetitive motion condition causing the repetitive trigger events is likely to have stopped. Once the quiet period has expired, the processing unit can resume normal operation in which the actuation signal is sent in response to detection of each trigger event.

In one embodiment, a mechanism for reducing the false trigger rate only relies on the logical output (indicating whether or not a trigger event has occurred) of the sensor processing procedure, and therefore can be implemented in conjunction with any of a variety of sensor processing procedures that provide such a logical output based on the raw sensor signal.

FIG. 1 is a top-down view of a data storage device 103, which contains a data storage medium 102, such as a magnetic storage medium, and an actuator 104 having a magnetic read/write head 106. Read/write head 106 reads and writes data to tracks 108 on data storage medium 102. A safe parked position 126 for actuator 104 is indicated by broken lines.

Data storage device 103, such as a hard disk drive (HDD) is operatively coupled to system electronics 112 (discussed with reference to FIG. 2 below). In response to commands from system electronics 112, data storage device 103 moves actuator 104 and magnetic read/write head 106 rapidly sideways in a plane approximately parallel to the data storage medium 102 between its operating position and the parked position 126.

In one embodiment, data storage device 103 also includes a free fall detection system 140 including an accelerometer 120 and a processing unit 130 that includes a trigger event generator 131, event logic 133, and trigger counter 135. The accelerometer 120 provides a raw signal 121 to the trigger event generator 131. The trigger event generator 131 provides a trigger event signal 132 to the event logic 133. The event logic 133 provides an actuation signal 134 to the actuator 104. Event logic 133 is further coupled to trigger counter 135.

The accelerometer 120 may be a sensor such as a free-fall sensor or other sensor capable of measuring acceleration or inertial forces. In one embodiment, the accelerometer 120 measures the acceleration experienced by the data storage device 103 and outputs a raw signal 121 corresponding to the amount of the acceleration measured.

The raw signal 121 is received by the trigger event generator 131, which generates a trigger event signal 131 by applying a sensor processing procedure to the raw signal 121. For example, the sensor processing procedure may dictate that a measured acceleration level that exceeds an acceleration threshold for a time exceeding a duration threshold should be identified as a trigger event. Accordingly, when the trigger event generator 131 receives a raw signal 121 indicating a measured acceleration that exceeds these thresholds, the trigger event generator 131 outputs a signal 132 indicating that a trigger event has occurred.

The trigger event signal 132 is received by the event logic 133, which generates an actuation signal 134 based on the pattern of trigger events received. In one embodiment, the event logic 133 operates according to a normal mode of operation by responding to the occurrence of each trigger event by sending an actuation signal 134 to actuator 104.

In one embodiment, the actuation signal 134 causes a HDD actuator 104 to move into parked position 126 for a duration of time, which may be referred to as a park duration. Upon lapse of the park duration, the actuator 104 may unpark, or move from the parked position 126.

In addition, the event logic 133 also determines whether a trigger event is a false trigger by monitoring the repetition of trigger events. In one embodiment, event logic 133 is configured to store the number of trigger events received in trigger counter 135. Trigger counter 135 may be implemented as a register or other memory.

In one embodiment, the event logic 133 may initiate a quiet period (during which the event logic 133 operates in quiet mode) in response to receiving a threshold number of trigger events within a predefined time period. For example, the event logic 133 may initiate the quiet period in response to receiving three trigger events within a 30 second time window.

In one embodiment, during the quiet period, the event logic 133 bypasses taking a preventative action in response to detecting a trigger event 132. For example, event logic 133 may inhibit or prevent actuation signal 134 from being sent to actuator 104 even though a trigger event 132 is received from trigger event generator 131. Thus, even if a trigger event 132 is detected during the quiet period, the HDD actuator 104 is not parked.

Thus, the event logic 133 detects a repetitive motion condition based on the pattern of trigger events detected, and responds by initiating a quiet period during which the preventative action (i.e., parking the HDD actuator 104) is bypassed. This behavior reduces the amount of unnecessary parking of the actuator 104, increasing the availability of the head 106 to read or write data.

In an alternative embodiment, the event logic 133 sends a quiet signal (not shown) to the trigger event generator 131 to indicate the initiation of the quiet period. In response to the quiet signal, the trigger event generator adjusts its threshold for identifying trigger events. For example, during normal operation, the trigger event generator 131 may identify a trigger event 132 when the raw signal 121 indicates an acceleration of 0.4 g for a duration of 40 ms. During the quiet period, this trigger threshold may change so that trigger events are less likely to occur. For example, the acceleration threshold of 0.4 g may change to 0.3 g, or the duration threshold of 40 ms may change to 50 ms during the quiet period.

In one embodiment of a process for reducing false triggers, the event logic 133 uses a learning scheme to set a more conservative trigger threshold that depends on the level and duration of g-forces detected by the accelerometer during the quiet period. For example, if repeated triggers result from an acceleration of 0.4 g for a duration of 40 ms, the trigger threshold during the quiet period may be set at 0.3 g for a duration of 45 ms so that similar repeated triggers would not cause a trigger event during the quiet period. Thus, the trigger threshold is increased by a certain margin to prevent similar trigger events from occurring during the quiet period.

In one embodiment, the trigger threshold used during the quiet period may be an adaptive value that changes based on actual values recorded by the accelerometer before or during the quiet period. For example, the level of the quiet period trigger threshold may be set based on such values as the average or maximum value of past values recorded by the accelerometer, or an average plus a multiple of the standard deviation of past recorded values. One advantage of this scheme is that when a new threshold is set based on the actual recorded values, the event logic 133 will more reliably exit the quiet period because a substantially lower amount of accelerometer reading may be required to return to the normal operating mode. For example, an exit criteria based on a hard coded number (i.e. an empirically determined threshold or a threshold pre-set prior to the device being used) may not account for different usage characteristics between different users. Thus, in some cases, the actual accelerometer reading during the quiet period (having the more conservative trigger detection threshold) due to repetitive motion may still be low enough that the conservative threshold would not properly identify the motion as a repetitive motion. Therefore, the scheme may further minimize future false triggers by using this actual accelerometer reading as a learned quiet period threshold. In one embodiment, the learned quiet period trigger threshold may be continually adjusted during the quiet period. In other embodiments, the level of the quiet period trigger threshold may be set based on other inputs.

Thus, the event logic 133 responds to a repetitive motion condition that causes repeated false trigger events by initiating a quiet period, during which the number of false trigger events is reduced by adjusting the threshold for identifying trigger events. The number of times the actuator 104 is unnecessarily parked is reduced as a result of the reduction in false trigger events.

In one embodiment, event logic 133 continues to monitor the trigger events received from trigger event generator 131 during the quiet period to determine when to terminate the quiet period. The event logic may terminate the quiet period when one or more expiration criteria are met. For example, the event logic 133 may terminate the quiet period in response to expiration criteria such as the lapse of a time interval since the initiation of the quiet period or detection of a user input. In one embodiment, the event logic 133 terminates the quiet period in response to detecting a lack of false trigger events during a time interval. For example, the event logic 133 may terminate a quiet period in response to determining that no trigger events or less than a predetermined number of trigger events have been detected during a 90 second period of time.

In one embodiment, accelerometer 120 includes logic implementing trigger event generator 131 so that the functions of trigger event generator 131 are not performed within processing unit 130, but are instead performed within accelerometer 120. In an alternative embodiment, the accelerometer 120 includes an inertial switch, and trigger events are indicated by the raw output of the inertial switch.

In some embodiments, any of accelerometer 120, trigger event generator 131, event logic 133, or processing unit 130 may be located outside of the data storage device 103. For example, the accelerometer 120 may be attached to a chassis of a mobile computer system containing the data storage device 103, or the functions performed by processing unit 130 may be implemented by a central processing unit (CPU) of such a computer system.

Figure 2A:
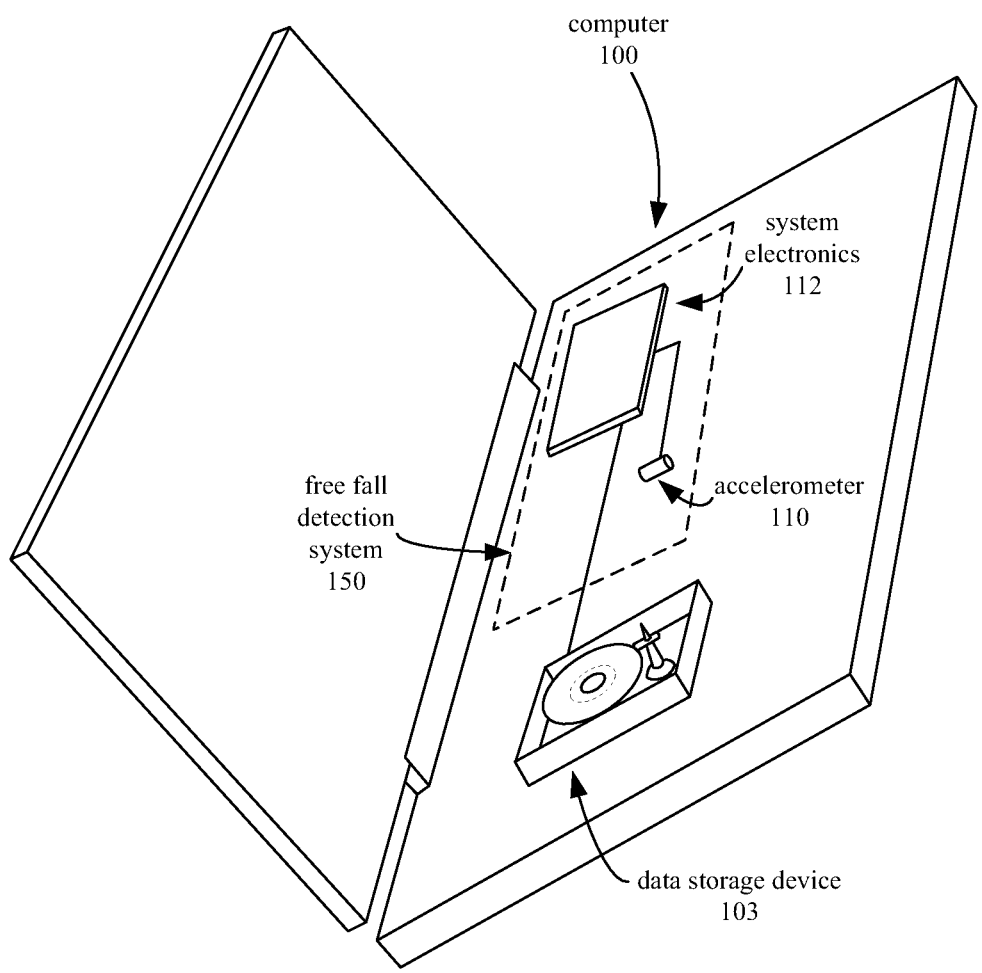
FIG. 2A illustrates one embodiment of a mobile computer system.

FIG. 2A shows a perspective view of one embodiment of a mobile computer system, as an example of a portable device, in which a free fall detection system may be implemented. Computer 100 includes a free fall detection system 150 (including accelerometer 110 and system electronics 112) in addition to the free fall detection system 140 (including accelerometer 120 and processing unit 130 within data storage device 103), as described with reference to FIG. 1 above.

In one embodiment, free fall detection system 150 is configured to detect free fall events with less sensitivity than free fall detection system 140. For example, while free fall detection system 140 may detect falls from a height of three inches, free fall detection system 150 may only be able to detect falls from a height of eight inches. In one embodiment, the two free fall detection systems 140 and 150 may be used in conjunction, with each system 140 and 150 independently capable of initiating a preventative action, such as parking the HDD actuator 104, in response to a trigger event such as a free fall. Thus, the more sensitive detection system 140 can respond to free fall events that are too small to trigger detection system 150, while detection system 150 can respond to free fall events that fail to trigger detection system 140.

Typically, a data storage device such as data storage device 103 that includes free fall detection system 140 is installed within a main housing of a computer 100, such as the notebook computer illustratively shown. However, it is understood that the invention is not limited to computers such as the one illustratively shown in FIG. 1. Rather, the invention applies to and may complement any data storage device 103 wherever such device is located. For example, and for purposes of illustration only and not limitation, a data storage device 103, such as a hard disk drive, may be located within a camera or other portable consumer electronic device, within an onboard vehicular computer, an elevator, an amusement park ride, etc. Moreover, in other embodiments, the data storage device may store analog data instead of digital data and the data storage device may use optical mechanisms to read and/or write the data. In addition, a preventative action is not limited to parking an actuator of a data storage device. A preventative action may simply be configuring a portable device from one operating state to another operating state. Further, an accelerometer may be attached to any part of the portable device, not just to a data storage device.

In addition to free fall detection system 140, accelerometer 110 and system electronics 112 of free fall detection system 150 are also electrically coupled to the hard disc drive 103 such that when accelerometer 110 detects a state of free fall, system electronics 112 commands the disc drive 103 to put the actuator 104 and magnetic (or optical) head 106 in a parked position before the fall is completed. Alternatively, sensor 110 can be used to detect changes in non-gravitational (inertial) acceleration, an acceleration or de-acceleration of the sensor's reference frame caused by mechanisms such as automobile or aircraft engines or vehicular brakes.

In one embodiment, accelerometer 110 is located near or at the center of mass of the computer 100 or other mobile device so that sensing of the free fall state will be independent of any rotation and centrifugal forces present during the fall. Alternatively, the accelerometer 110 and system electronics 112 may be located at some other position allowing them to perform the monitoring and command functions described above.

In one embodiment, the process for minimizing false triggers as performed by processing unit 130 in free fall detection system 150 may also be implemented in system electronics 112 of free fall detection system 150 to minimize the number of false trigger events detected by an accelerometer such as accelerometer 110. In one embodiment, the mobile device may include only one of free fall detection systems 140 or 150.

Figure 2B:
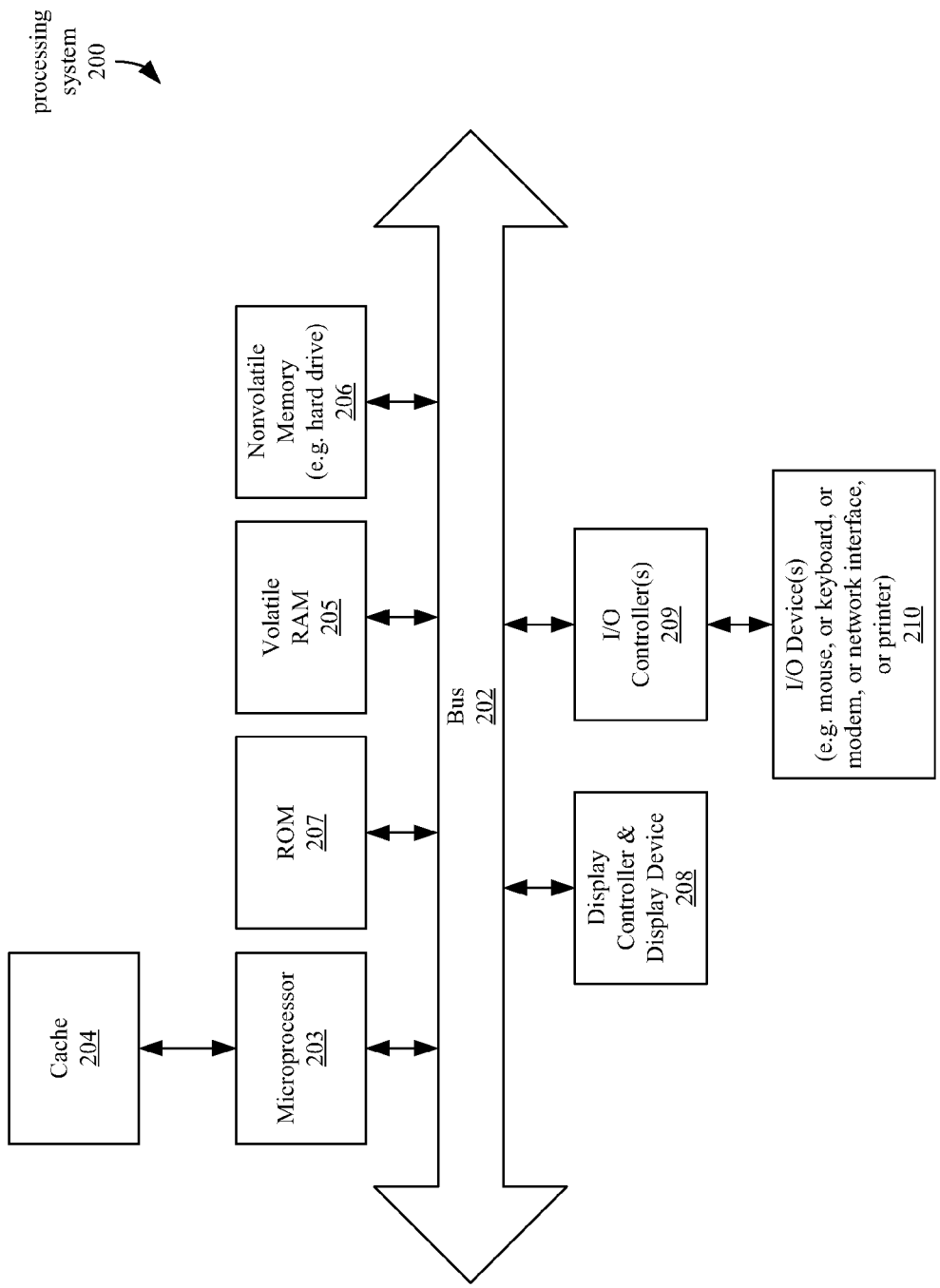
FIG. 2B illustrates one embodiment of a processing system.

FIG. 2B is a block diagram of a digital processing system, which may be used with one embodiment of the invention. For example, the processing system 200 shown in FIG. 2B may be implemented in a computer system such as computer 100 of FIG. 2A.

Note that while FIG. 2B illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 2B may, for example, be an Apple Macintosh computer or an IBM compatible PC.

As shown in FIG. 2B, the computer system 200, which is a form of a data processing system, includes a bus 202 which is coupled to a microprocessor 203 and a ROM 207, a volatile RAM 205, and a non-volatile memory 206. The microprocessor 203, which may be, for example, a microprocessor from Motorola, Inc. or Intel, is coupled to cache memory 204 as shown in the example of FIG. 2B. Microprocessor 203 may include multiple processors or multiple core logics (e.g., logical processors). The bus 202 interconnects these various components together and also interconnects these components 203, 207, 205, and 206 to a display controller and display device 208, as well as to input/output (I/O) devices 210, which may be mice, keyboards, modems, network interfaces, printers, and other devices which are well-known in the art.

Typically, the input/output devices 210 are coupled to the system through input/output controllers 209. The volatile RAM 205 is typically implemented as dynamic RAM (DRAM) which requires power continuously in order to refresh or maintain the data in the memory. The non-volatile memory 206 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 2B shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 202 may include one or more buses connected to each other through various bridges, controllers, and/or adapters, as is well-known in the art. In one embodiment, the I/O controller 209 includes a USB (Universal Serial Bus) adapter for controlling USB peripherals. Alternatively, I/O controller 209 may include an IEEE-1394 adapter, also known as FireWire adapter, for controlling FireWire devices.

According to one embodiment, system 200 includes a free fall processing unit, such as processing unit 130 of FIG. 1 to perform a process as described above.

Figure 3:
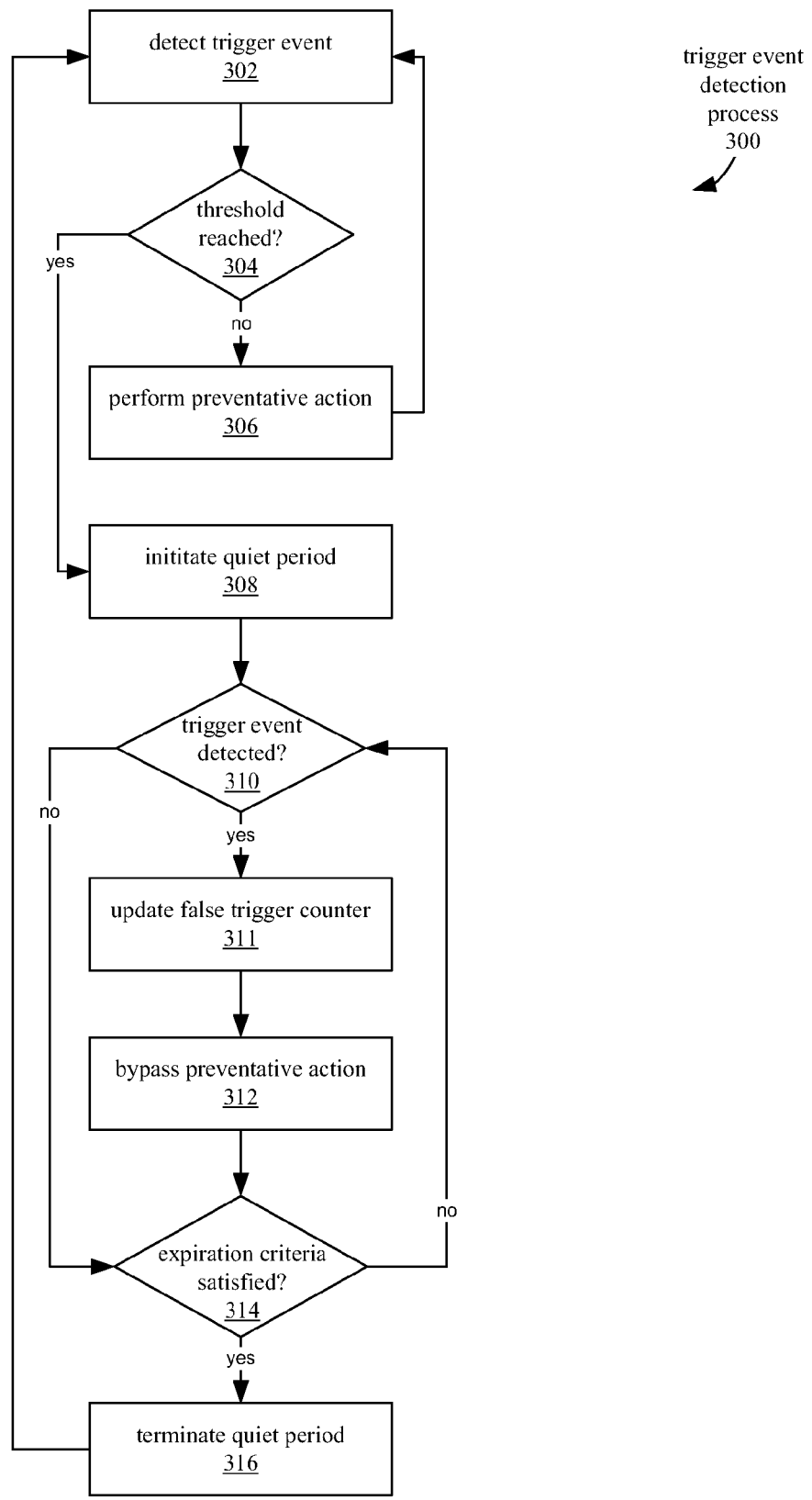
FIG. 3 is a flow diagram illustrating one embodiment of a trigger event detection process.

FIG. 3 is a flow diagram illustrating a process for detecting trigger events, according to one embodiment. Note that process 300 may be performed by processing logic which may includes hardware, software, or a combination of both. For example, trigger event detection process 300 may be performed by a processing unit such as processing unit 130, system electronics 112, or processing system 200.

At block 302, the processing unit detects a trigger event. For example, the processing unit 130 processes a raw signal 121 from accelerometer 120 using trigger event generator 131. Trigger event generator 131 applies a sensor processing procedure to raw signal 121 to determine when to generate trigger event 132. In one embodiment, trigger event generator 131 may generate a trigger event 132 when raw signal 121 indicates that the accelerometer 120 has experienced greater than a threshold level of acceleration for longer than a threshold duration of time. The trigger event 132 generated by the trigger event generator 131 is detected at event logic 133. In an alternative embodiment, a trigger event is generated by logic integrated with the accelerometer, rather than being generated within the processing unit 130.

At block 304, the processing unit determines whether a threshold number of trigger events has been detected within a time window. In one embodiment, the event logic 133 counts the number of times a trigger event 132 is detected within a given time window and compares the count value with the threshold number of trigger events.

If, upon receiving a trigger event 132, the event logic determines that the number of trigger events received within the time window does not exceed the threshold, the process continues to block 306.

FIG. 4A is a timeline illustrating a trigger event detection process 300 that initiates a quiet period after detecting a threshold number of three trigger events within a time window. With reference to FIG. 4A, the processing unit 130 at block 302 detects a first trigger event 411 within time window 401. Since the threshold number of three trigger events has not been reached at the time of trigger event 411, the process 300 continues to block 306.

At block 306, the processing unit performs a preventative action. For example, the processing unit 130 may perform the preventative action of sending actuation signal 134 to actuator 104 to park actuator 104 in the parked position 126. In one embodiment, actuator 104 may remain in the parked position 126 for a duration of time, after which the actuator 104 is allowed to move from the parked position 126. In alternative embodiments, the preventative action may include the movement of other types of actuators. In one embodiment, the process 300 continues back to block 302, where further trigger events are detected. Thus, blocks 302, 304, and 306 are repeated while the processing unit is operating in normal mode.

If, at block 304, the processing unit 130 determines that the threshold number of trigger events detected within the time window exceeds the threshold, the process 300 continues to block 308, at which a quiet period is initiated. For example, if the processing unit 130 at block 302 detects trigger event 412, which is the third trigger event encompassed within time window 410. Accordingly, at block 304, the processing unit determines that the threshold number of three trigger events within the time window has been reached.

In one embodiment, the time window 401 is defined by a duration of time, such as a 30 second interval. The time window may be a static time window that begins and ends at set points in time. In an alternative embodiment, the time window is a moving time window, that is defined by a duration of past time relative to the current time. For example, the processing unit may count the number of trigger events detected within the past 30 seconds of the present time.

At block 308, the processing unit initiates a quiet period in response to determining that the threshold number of trigger events detected during the time window has been reached. During the quiet period, such as quiet period 402, the processing unit operates in quiet mode. The processing unit remains in quiet mode while performing operations represented by blocks 310, 312, and 314 during the quiet period.

At block 310, the processing unit determines whether a trigger event has been detected during the quiet period. For example, with reference to FIG. 4A, the processing unit may detect trigger event 413 during quiet period 402. In response to detecting a trigger event during the quiet period, the process 300 continues to block 312.

At block 311, the processing unit updates a false trigger counter in response to determining that a trigger event has been detected during the quiet period. For example, trigger counter 135 may be used as a false trigger counter. Accordingly, at block 311, the event logic 133 of processing unit 130 may increment a trigger count value stored in trigger counter 135. In one embodiment, the trigger counter 135 is used to keep track of the number of false triggers occurring within a specific time window. Accordingly, updating the false trigger counter may include decrementing the false trigger count value for each false trigger event that has been left outside the time window since the last update of the false trigger counter.

At block 312, the processing unit bypasses performing the preventative action in response to detecting the trigger event at block 310. For example, the event logic 133, which during normal operation outside of a quiet period would send an actuation signal 134, may instead suppress or bypass sending the actuation signal. In one embodiment, this may be implemented using logic, such as an AND gate. In alternative embodiments, the processing unit may bypass or suppress some preventative action other than sending an actuation signal. From block 312, or from block 310 (if a trigger event is not detected at block 310), the process 300 continues to block 314.

At block 314, the processing unit determines whether expiration criteria for terminating the quiet period have been satisfied. If the expiration criteria are not satisfied, the process 300 continues back to block 310, so that blocks 310, 312, and 314 are repeated until the expiration criteria are satisfied. In one embodiment, the expiration criteria may include the lapse of a quiet period duration. For example, the processing unit may automatically terminate the quiet period 402 after the lapse of a 90 second quiet period duration, measured from the start time 404 of the quiet period 402.

In one embodiment, the termination of the quiet period depends on the satisfaction of a single expiration criterion. In alternative embodiments, the termination of the quiet period depends on the concurrent satisfaction of several expiration criteria.

In one embodiment, the expiration criteria are satisfied when no trigger events or less than a predetermined number of trigger events have been received during the quiet period. For example, the processing unit may not terminate quiet period 402 after lapse of the 90 second quiet period duration because two trigger events were detected during the quiet period 402. In one embodiment, the processing unit extends the quiet period 402 until no trigger events or less than a predetermined number of trigger events have been detected within the last 90 seconds prior to the current time. In an alternative embodiment, the processing unit initiates a new quiet period 403 lasting for another 90 seconds if the expiration criteria have not been met. In other embodiments, durations other than 90 seconds may be used.

FIG. 4B is a timeline illustrating a quiet period that is terminated in response to determining that the expiration criteria are satisfied, according to block 314. The quiet period 422 starts at quiet period start time 424 following time window 421 during which, for example, three trigger events are detected. At quiet period end time 425, the quiet period duration of 90 seconds has lapsed, and no trigger events or less than a predetermined number of trigger events were detected during the quiet period 422. Accordingly, processing unit determines that the expiration criteria have been satisfied.

At block 316, the processing unit terminates the quiet period in response to determining that the expiration criteria have been satisfied. Thus, the processing unit ceases operating in quiet mode and resumes operating in normal mode. With reference to FIG. 4B, the processing unit terminates quiet period 422 at end time 425 and resumes normal operation during normal period 423. In one embodiment, the process 300 continues back to block 302, 304, and 306, where the processing unit performs the normal mode operations of detecting trigger events and responding to the trigger events by performing preventative actions (i.e., parking a HDD actuator) until the threshold number of trigger events within a time window has been reached.

The number of trigger events detected during the quiet period is thus used to determine whether the repetitive motion condition causing the repeated trigger events has abated. Until the repetitive motion condition has abated, the processing unit accordingly remains in quiet mode to avoid taking preventative action unnecessarily.

Figure 5:
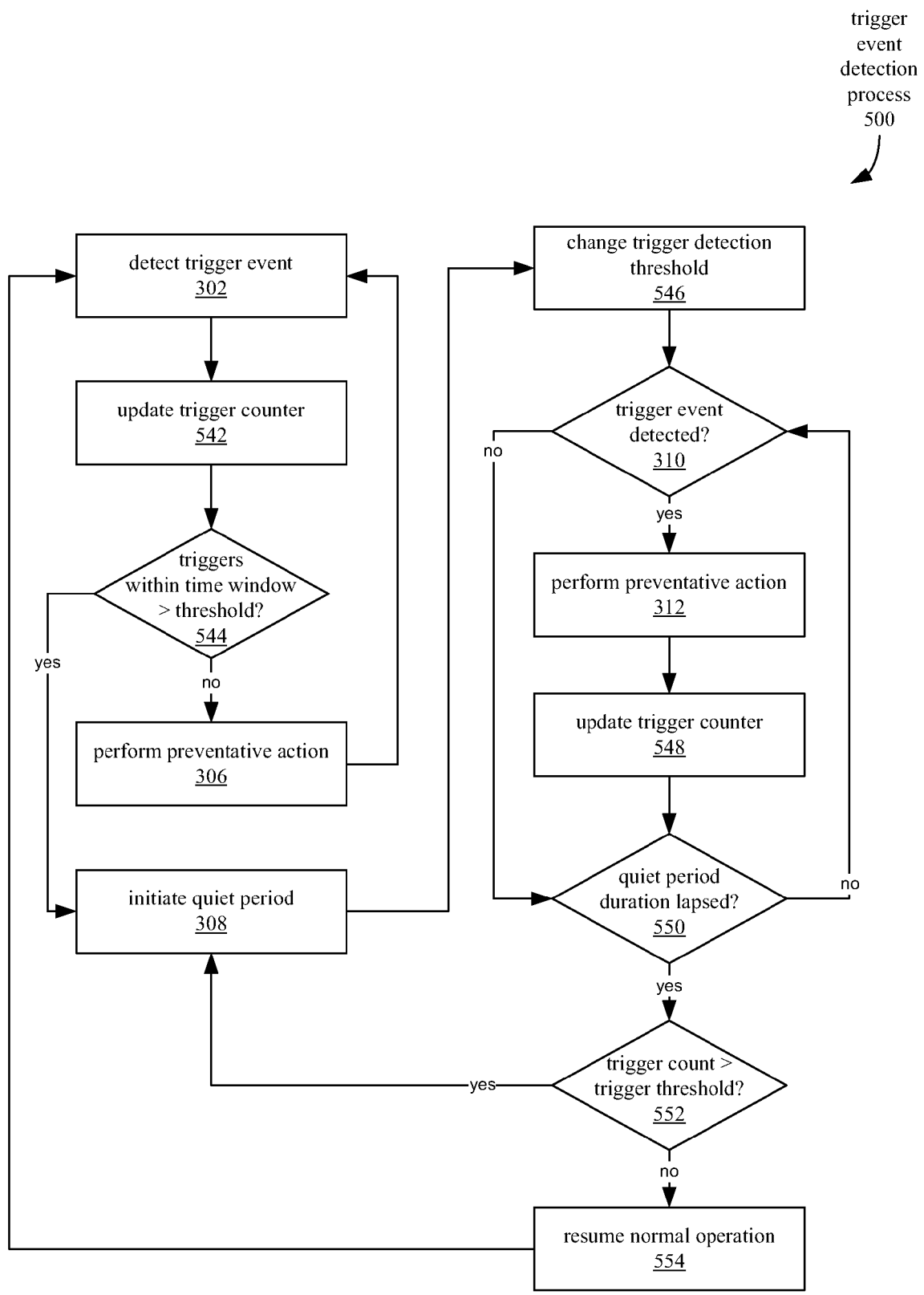
FIG. 5 is a flow diagram illustrating one embodiment of a trigger event detection process.

FIG. 5 is a flow diagram illustrating a process for detecting trigger events, according to one embodiment where trigger detection thresholds are adjusted during the quiet period. Note that process 500 may be performed by processing logic which may include hardware, software, or a combination of both. For example, trigger event detection process 500 may be performed by a processing unit such as processing unit 130, system electronics 112, or processing system 200. Similar operations are performed at blocks 302, 306, 308, 310, and 312 of trigger event detection process 500 as are performed in the corresponding blocks of trigger event detection process 300.

At block 302, the processing unit detects a trigger event. At block 542, the processing unit updates a trigger counter in response to detecting the trigger event at block 302. For example, event logic 133 may respond to detecting a trigger event 132 by updating trigger counter 135. In one embodiment, the event logic 133 increments a trigger count value in trigger counter 135 to account for the trigger event detected at block 302. In one embodiment, the trigger counter is used to keep track of the number of trigger events occurring within a time window. Accordingly, the event logic may also decrement the trigger count value in trigger counter 135 for each trigger event that is no longer within the time window.

For example, with reference to FIG. 4A, a processing unit detecting trigger event 412 may update a trigger count to three, since trigger event 412 is the third trigger event occurring within time window 401.

At block 544, the processing unit uses the trigger counter to determine whether the number of trigger events detected within the time window exceeds a threshold number of trigger events for initiating a quiet period. In one embodiment, the processing unit may perform a direct comparison of the trigger count value with the threshold value. If the number of trigger events detected within the time window does not exceed the threshold, the process 500 continues to block 306.

At block 306, the processing unit performs a preventative action. For example, the processing unit 130 may perform the preventative action of parking actuator 104.

Thus, blocks 302, 542, 544, and 306 are repeated according to the normal mode operation of the processing unit until the number of trigger events counted by the trigger counter exceeds the threshold number of trigger events for initiating the quiet period.

If, at block 544, the number of trigger events detected within the time window exceeds the threshold, the process 500 continues to block 308. At block 308, the processing unit initiates a quiet period in response to determining that the threshold number of trigger events detected during the time window has been reached.

At block 546, the processing unit changes the trigger detection threshold by adjusting one or more thresholds used to generate trigger events from a raw signal, such as the signal from an accelerometer. In one embodiment, changing the trigger detection threshold includes sending a quiet signal to a trigger event generator implementing a sensor processing procedure that uses the trigger detection threshold. For example, event logic 133 of processing unit 130 may send a quiet signal to trigger event generator 131 to cause trigger event generator 131 to adjust the trigger event detection threshold.

In one embodiment, the trigger detection threshold includes a set of thresholds, such as an acceleration threshold and a duration threshold. For example, a trigger event 132 may be generated by trigger event generator 131 according to one trigger detection threshold when the acceleration indicated by raw signal 121 is less than an acceleration threshold of 0.3 g for a time exceeding a duration threshold of 40 ms. Adjustment of the trigger detection threshold may include the adjustment of either or both of the acceleration threshold and the duration threshold.

At block 310, the processing unit determines whether a trigger event has been detected according to the adjusted trigger detection threshold.

At block 312, the processing unit performs a preventative action, such as parking a HDD actuator, in response to determining that a trigger event has been detected during the quiet period, where the trigger event is detected using the adjusted trigger detection threshold.

In one embodiment, the preventative action performed according to block 312 is the same preventative action that is performed according to block 306. In alternative embodiments, the preventative action is modified. For example, if the preventative action is the parking of a HDD actuator, the actuator may remain parked for a shorter or longer duration if the parking is performed during the quiet period, as compared to when the parking is performed during normal operation.

At block 548, the processing unit updates the trigger counter to account for the trigger event detected at block 310. In one embodiment, the trigger counter is used to keep track of the number of trigger events detected during the quiet period. Thus, according to one embodiment, the trigger counter may be reset at the beginning of each quiet period. In an alternative embodiment, the trigger counter is used to keep track of the number of trigger events detected within a time period relative to the current time. For example, the trigger counter may be used to track the number of trigger events detected during the last 90 seconds prior to the current time. Accordingly, the trigger count may be decremented to reflect trigger events that are no longer within this time window.

At block 550, the processing unit determines whether the quiet period duration has lapsed. For example, the quiet period 422 has a quiet period duration of 90 seconds, so that if 90 seconds has elapsed since the quiet period start time 424, the processing unit at block 550 determines that the quiet period duration has lapsed. If the quiet period duration has lapsed, the process continues at block 550.

At block 552, the processing unit determines whether the trigger count value stored in the trigger counter exceeds a quiet period trigger threshold. If the trigger count exceeds the quiet period trigger threshold, the process 500 continues back to block 308, where another quiet period is initiated. Thus, if a threshold number of trigger events is detected during the quiet period, the repetitive motion condition likely has not abated, and the processing unit continues operating in quiet mode to avoid taking preventative action unnecessarily.

If the trigger count does not exceed the quiet period trigger threshold, the repetitive motion condition has likely abated, and the process 500 continues to block 554, where the processing unit resumes normal operation. For example, a processing unit may terminate quiet period 422 by resuming normal operation (during normal period 423), since no trigger events were detected during quiet period 422. While operating in normal mode, the processing unit performs the operations corresponding to blocks 302, 542, 544, and 306, as previously described.

Figure 6:
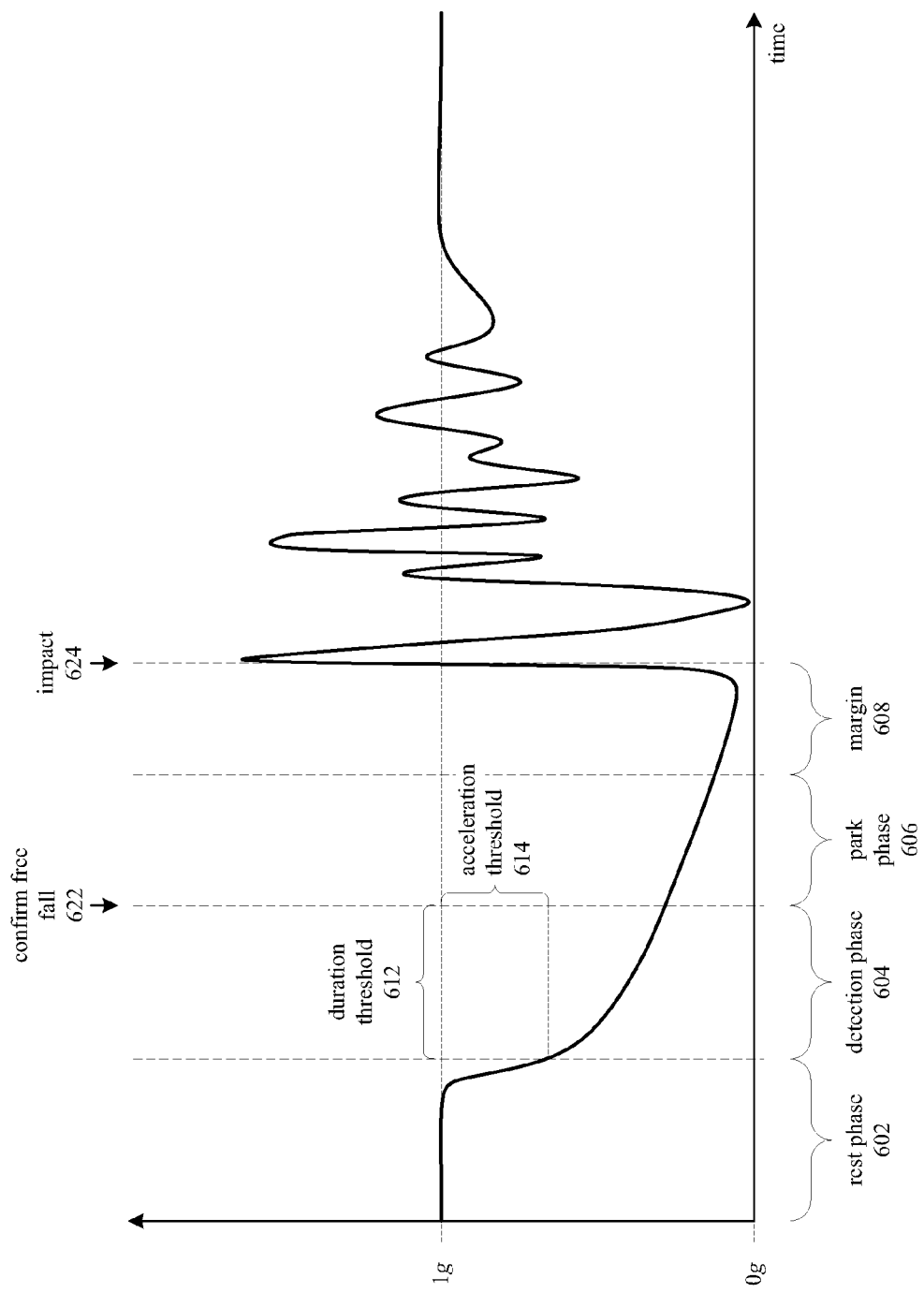
FIG. 6 is a line graph illustrating acceleration measured by an accelerometer during a free fall of a mobile electronic device, according to one embodiment.

FIG. 6 is a line graph illustrating an acceleration signal 630 measured by an accelerometer, such as accelerometer 120, over time. FIG. 6 further illustrates phases associated with a free fall and impact of a mobile electronic system, such as computer 100, including a rest phase 602, a detection phase 604, and a park phase 606.

During the rest phase 602, the computer 100 is stationary, and experiences a g-force of 1 g. At the end of rest phase 602, the computer 100 begins a free fall, which is detected by the accelerometer 120 as a decrease in the measured g-force.

During the detection phase 604, trigger event generator 131 generates a trigger event 132 according to a trigger event detection threshold. In one embodiment, the trigger event generator 131 generates the trigger event 132 if the g-force drops below acceleration threshold 614 for a time exceeding the duration threshold 612. When the trigger threshold has been met, free fall is confirmed at time 622, at the end of the detection phase. Accordingly, a trigger event 132 is sent at time 622, and is detected by event logic 133. This corresponds to block 302 of processes 300 and 500.

During the park phase 606, a preventative action of parking the actuator 104 is taken. The park phase corresponds, for example, to block 306 or 312 of process 300 or 500. During the park phase, the event logic 133 sends the actuation signal 134 to the actuator 104 to cause the actuator 104 to move into the parked position 126. The time for this process to complete is represented by the duration of the park phase 606. At the end of park phase 606, the actuator 104 is parked in preparation for impact at time 624. The time between when the actuator is parked and the time of impact 624 is represented by margin 608.

During a quiet period, the duration threshold 612 or the acceleration threshold 614 may be adjusted to reduce the number of false triggers detected during the quiet period. For example, a repetitive motion condition may cause the accelerometer 120 to detect a number of events where a force of 0.35 g is sustained for a duration of 35 ms. If these events are caused by motions not likely to damage the data storage device 103, then trigger events generated from these events can be considered false triggers. During the quiet period, when false triggers are more likely to occur, the acceleration threshold 614 or the duration threshold 612 can be adjusted so that trigger events are not generated from these events.

For example, during the normal mode, an acceleration threshold 614 of 0.4 g and a duration threshold of 30 ms would result in a trigger event in response to a measured force of 0.35 g sustained for a duration of 35 ms. In contrast, during a quiet period where the acceleration threshold 614 and the duration threshold 612 are adjusted to 0.3 g and 40 ms, respectively, the same measured force does not result in a trigger event.

In one embodiment, a process for reducing false triggers uses a learning scheme to set a more conservative trigger threshold that depends on the level and duration of g-forces detected by the accelerometer during the quiet period. The quiet period trigger threshold may be increased above previously detected values by a certain margin to prevent similar trigger events from occurring during the quiet period.

In one embodiment, the trigger threshold used during the quiet period may also be an adaptive value that changes based on actual values recorded by the accelerometer before or during the quiet period. For example, the level of the quiet period trigger threshold may be set based on such values as the average or maximum value of past values recorded by the accelerometer, or an average plus a multiple of the standard deviation of past recorded values. In one embodiment, the quiet period trigger threshold may continue to be adjusted during the quiet period. In other embodiments, the level of the quiet period trigger threshold may be set based on other inputs.

Since the adjusted trigger threshold tolerates forces of greater magnitude and duration, the number of trigger events detected during the quiet period is decreased, along with the number of times that the preventative action is performed. In one embodiment where the preventative action includes parking a HDD actuator, reducing the number of times the actuator is parked increases the availability of the HDD read/write head to access data on the HDD.

Embodiments of the present invention thus reduce the rate of false triggers detected by an accelerometer, thereby reducing the number of unnecessary preventative actions performed in response to the false triggers. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

Moreover, the description of FIGS. 1, 2A, and 2B is intended to provide an overview of computer hardware and other operating components suitable for performing the methods of the invention described above, but is not intended to limit the applicable environments. One of skill in the art will immediately appreciate that the invention can be practiced with other computer system configurations. The invention can also be practiced in distributed computing environments where tasks are performed by remote processing devices that are linked through a communications network.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the method illustrated in FIGS. 3 and 5 without departing from the scope of the invention and that no particular order is implied by the arrangement of blocks shown and described herein.

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Therefore, it is manifestly intended that this invention be limited only by the following claims and equivalents thereof.

What is claimed is:

1. A computer-implemented method, comprising:
    performing, by a processing device of a portable device, a preventative action in response to detecting a first trigger event triggered by an accelerometer attached to the portable device, wherein the preventative action includes:
        parking a hard disk drive actuator for a first duration of time, and
        unparking the hard disk drive actuator after the first duration of time has lapsed;
    initiating, after the first duration of time has lapsed, a first quiet period in response to detecting at least one repeated trigger event within a time window encompassing the first trigger event;
    bypassing performing the preventative action for a subsequent trigger event detected during the first quiet period;
    terminating the first quiet period if a number of repeated trigger events detected during the first quiet period drops below a first predetermined threshold, wherein the preventative action is to be performed in response to a next trigger event generated by the accelerometer after the first quiet period has been terminated; and
    initiating a second quiet period from an end of the first quiet period if the number of repeated trigger events detected during the first quiet period is above a second predetermined threshold.

2. The computer-implemented method of claim 1, further comprising:
    parking the hard disk drive actuator for a second duration in response to the at least one repeated trigger event, wherein the second duration is different than the first duration; and
    unparking the hard disk drive actuator after the second duration has lapsed.

3. The computer-implemented method of claim 1, wherein the first trigger event and the repeated trigger event are free fall events detected by the accelerometer.

4. The computer-implemented method of claim 1, wherein the first quiet period is terminated based on lapse of a time period during which an acceleration event is not detected.

5. A non-transitory machine-readable storage medium including instructions, when executed by a processor, cause the processor to perform operations comprising:
    performing a preventative action in response to detecting a first trigger event triggered by an accelerometer attached to a portable device, wherein the preventative action includes:

parking a hard disk drive actuator for a duration of time, and unparking the hard disk drive actuator after the duration of time has lapsed;

initiating, after the first duration of time has lapsed, a first quiet period in response to detecting at least one repeated trigger event within a time window encompassing the first trigger event;

bypassing performing the preventative action for a subsequent trigger event detected during the first quiet period;

terminating the first quiet period if a number of repeated trigger events detected during the first quiet period drops below a first predetermined threshold, wherein the preventative action is to be performed in response to a next trigger event generated by the accelerometer after the first quiet period has been terminated; and initiating a second quiet period from an end of the first quiet period if the number of repeated trigger events detected during the first quiet period is above a second predetermined threshold.

6. The non-transitory machine-readable storage medium of claim 5, wherein the instructions further comprise parking the hard disk drive actuator for a second duration in response to the at least one repeated trigger event, wherein the second duration is different than the first duration.

7. The non-transitory machine-readable storage medium of claim 5, wherein the first trigger event and the repeated trigger event are free fall events detected by the accelerometer.

8. The non-transitory machine-readable storage medium of claim 5, wherein the first quiet period is terminated based on lapse of a time period during which an acceleration event is not detected.

9. An apparatus, comprising:
a trigger event generator coupled with an accelerometer to generate a trigger event based on a raw signal from the accelerometer;
an event logic module coupled to the trigger event generator to generate an output signal from which a preventative action is performed, wherein the preventative action includes:
parking a hard disk drive actuator for a first duration of time, and
unparking the hard disk drive actuator after the first duration of time has lapsed, and
the event logic module is configured to:
initiate, after the first duration of time has lapsed, a first quiet period in response to detecting a threshold number of repeated trigger events within a time period,
bypass generating the output signal in response to receiving the trigger event if the trigger event is received during the first quiet period such that no preventative action is to be performed during the first quiet period,
extend the first quiet period if a number of trigger events detected during the first quiet period is greater than a first predetermined threshold, and
terminate the first quiet period if the number of trigger events detected during the first quiet period drops below a second predetermined threshold, wherein the preventative action is to be performed in response to the next trigger event generated by the accelerometer after the first quiet period has been terminated.

10. The apparatus of claim 9, wherein the trigger event generator is configured to generate the trigger event if an acceleration value indicated by the raw signal exceeds an acceleration threshold for a time exceeding a duration threshold.

11. The apparatus of claim 10, wherein the trigger event generator is further configured to increase the acceleration threshold during the first quiet period.

12. The apparatus of claim 10, wherein the trigger event generator is further configured to increase the duration threshold during the first quiet period.

13. The apparatus of claim 10, further comprising a second accelerometer coupled with a system electronics module, wherein the second accelerometer is configured to provide a second raw signal to the system electronics module, and wherein the processing unit is further configured to output the actuation signal if the second raw signal exceeds a second acceleration threshold for a time exceeding a second duration threshold.

14. A computer-implemented method, comprising:
performing, by a processor of a portable device, a normal detection routine in which in response to a trigger event from an accelerometer attached to the portable device indicating that the portable device is in a sudden move, a preventative action is performed, wherein the preventative action includes:
parking a hard disk drive actuator for a first duration of time, and
unparking the hard disk drive actuator after the first duration of time has lapsed;
initiating, after the first duration of time has lapsed, a quiet period if at least one subsequent trigger event is received, wherein during the quiet period no preventative action is performed;
extending the quiet period if a number of subsequent trigger events detected during the quiet period is greater than a first predetermined threshold;
terminating the quiet period if the number of subsequent trigger events detected during the quiet period drops below a second predetermined threshold; and
resuming the normal detection routine after the quiet period ends, wherein the preventative action is to be performed in response to a next trigger event generated by the accelerometer after the quiet period has been terminated.

15. The computer-implemented method of claim 14, wherein the normal detection routine is suspended once the quiet period starts.

16. The computer-implemented method of claim 14, wherein the quiet period ends based on a pattern of trigger events during the quiet period.

* * * * *